United States Patent [19]
Knowles

[11] Patent Number: 5,684,653
[45] Date of Patent: Nov. 4, 1997

[54] METHOD AND APPARATUS FOR MINIMIZING SEEK TIME IN A DISK DRIVE BY INCREASING POWER AMPLIFIER POWER BASED ON POWER AMPLIFIER VOLTAGE HEAD ROOM

[75] Inventor: Vernon L. Knowles, Eagle, Id.

[73] Assignee: Hewlett-Packard Company, Palo Alto, Calif.

[21] Appl. No.: 586,429

[22] Filed: Jan. 16, 1996

[51] Int. Cl.$^6$ ........................................ G11B 5/55
[52] U.S. Cl. ........................ 360/78.04; 360/78.06
[58] Field of Search ........................ 360/78.04, 78.06, 360/78.07, 78.09

[56] References Cited

U.S. PATENT DOCUMENTS

| | | | |
|---|---|---|---|
| 4,864,437 | 9/1989 | Couse et al. | 360/78.06 X |
| 4,914,644 | 4/1990 | Chen et al. | 360/78.09 X |
| 4,982,298 | 1/1991 | Volz et al. | 360/78.06 |
| 5,119,250 | 6/1992 | Green et al. | 360/78.06 |
| 5,305,161 | 4/1994 | Giovanetti et al. | 360/78.06 |
| 5,329,409 | 7/1994 | Hampshire | 360/78.04 X |
| 5,465,183 | 11/1995 | Hattori | 360/78.09 |

*Primary Examiner*—Aristotelis M. Psitos
*Assistant Examiner*—James L. Habermehl
*Attorney, Agent, or Firm*—Lane R. Simmons

[57] ABSTRACT

A system for minimizing seek time in a disk drive having a power amplifier for controlling a servo actuator. The system includes at least one output terminal of the power amplifier connected to a processor for detecting and calculating a head room voltage for the power amplifier for seek operations, the head room voltage indicative of a margin of power available for controlling seek operations. A preferred method includes calculating a head room voltage for the power amplifier by detecting a saturation value of the amplifier during an acceleration phase in a first seek direction, and detecting an output voltage during a deceleration phase for a second seek operation in an opposite direction. The method further includes adjusting power to the power amplifier on a next seek operation based on the head room voltage calculated, such that at least some of the margin of power available identified by the head room voltage is used on the next seek operation for reducing seek time.

20 Claims, 5 Drawing Sheets

METHOD AND APPARATUS FOR MINIMIZING SEEK TIME IN A DISK DRIVE BY INCREASING POWER AMPLIFIER POWER BASED ON POWER AMPLIFIER VOLTAGE HEAD ROOM

FIELD OF THE INVENTION

This invention relates in general to computer disk storage technology and, more specifically, to improving seek time performance in a disk drive.

BACKGROUND OF THE INVENTION

Computer data storage systems conventionally employ electrically inductive heads and/or magnetoresistive (MR) heads for reading and writing data to and from a disk drive. As a disk spins about its axis, the read/write heads float across the surface of the disk and are moved to and from inside and outside diameters of the disk in a seek path by electro-mechanical servo actuator means (either linear or rotary). Latency time is the time required for the disk to spin and position a location on the disk to within the seek path of the read/write heads. Seek time is the time required for the heads to be moved from one location in the seek path to another.

Obviously, latency time and seek time are critical elements for providing effective data storage systems, and especially for high speed storage systems. Accordingly, objects of the present invention are to improve disk drive performance by reducing the seek time involved.

SUMMARY OF THE INVENTION

According to principles of the present invention in a preferred embodiment, a system for minimizing seek time in a disk drive having a power amplifier for controlling a servo actuator includes an output terminal of the power amplifier connected to a processor. This configuration provides for detecting and calculating a head room voltage for the power amplifier for seek operations, the head room voltage indicative of a margin of power available for controlling seek operations.

According to further principles of the present invention in a preferred embodiment, a method includes calculating the head room voltage for the power amplifier by detecting a saturation value of the amplifier during an acceleration phase in a first seek direction, and detecting an output voltage during a deceleration phase for a second seek operation in an opposite direction. In an alternate embodiment, only one seek operation is required for determining the head room voltage. The method further includes adjusting power to the power amplifier on a next seek operation based on the head room voltage calculated, such that at least some of the margin of power available identified by the head room voltage is used on the next seek operation for reducing seek time.

Other objects, advantages, and capabilities of the present invention will become more apparent as the description proceeds.

DETAILED DESCRIPTION OF THE INVENTION

Figure 1:
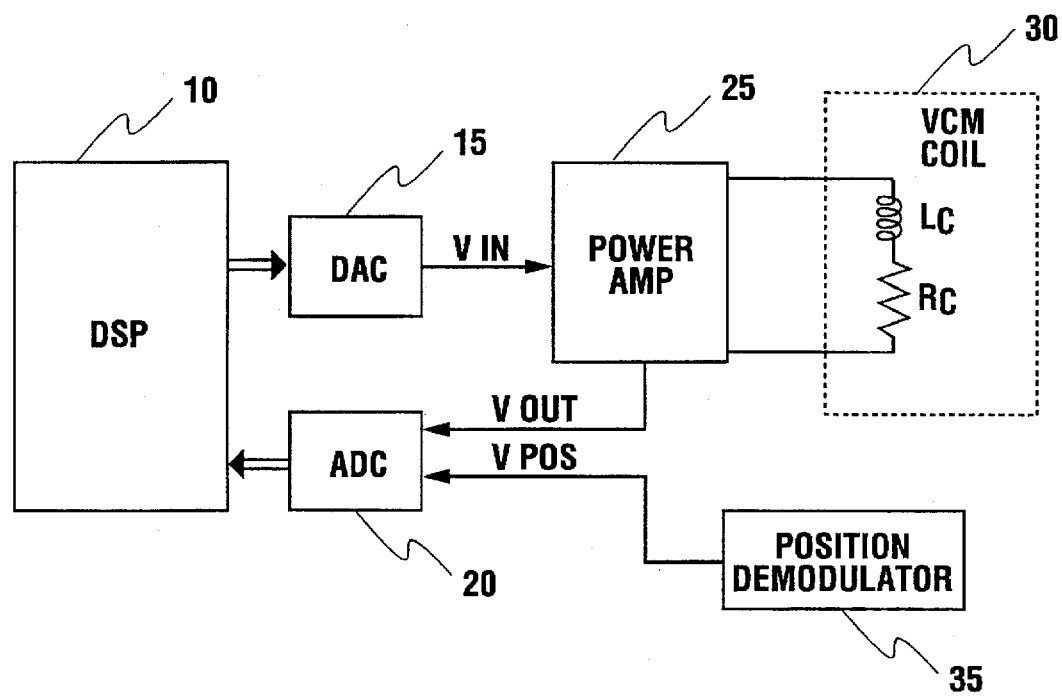
FIG. 1 is a schematic block diagram of a disk drive servo system embodying the present invention circuitry for monitoring head room voltage and adjusting a seek trajectory for reducing seek time in the disk drive.

FIG. 1 is a schematic block diagram of a disk drive servo system embodying the present invention circuitry for monitoring head room voltage and adjusting a seek trajectory for reducing seek time in the disk drive. Digital signal processor (DSP) 10 controls the servo loop for positioning an actuator (not shown) over the disk for reading/writing purposes. The DSP interfaces with both a digital-to-analog converter (DAC) 15, and an analog-to-digital converter (ADC) 20. The DAC connects to a power amplifier 25 (signal $V_{IN}$) which in turn drives a voice coil motor (VCM) 30. The position of the actuator is determined by a position demodulator 35 and fed into the ADC (signal $V_{POS}$).

Where electrical functions and connections are described in this disclosure, it is understood that it is possible, within the scope of this invention, to use equivalent circuits to perform the described functions. As an example, a transistor can be used as a diode or resistor. Likewise, two electrical components which are connected may have interceding components which physically separate the two components. "Connected" or "interfaced" is, therefore, intended to include components which are in electrical communication despite intervening components.

It is the job of the DSP to move the actuator from one position to another, and, once in a desired position, to maintain that position. This is accomplished by constantly monitoring the actual position ($V_{POS}$) via the ADC, comparing it to the desired position, and then writing a correction value to the DAC. These operations create the digital servo loop.

The present invention involves doing everything as previously mentioned, but in addition, includes a new signal (labeled $V_{OUT}$), received from power amplifier 25, which is also monitored by the DSP via the ADC. $V_{OUT}$ provides for a measurement to be taken (by the DSP) of the voltage drive head room existing in power amplifier 25. Voltage drive head room is defined as the difference between: the minimum (or maximum) voltage capable of being output by the power amplifier while maintaining circuit integrity, and the voltage actually measured at $V_{OUT}$ during a specified seek operation. Or in other words:

$$V_{HR} = V_{OUT} - V_{MIN}$$

or $$V_{HR} = V_{MAX} - V_{OUT}$$

and $$V_{MIN} = V_{GROUND} + V_{SAT}(low)$$

$$V_{MAX} = V_S - V_{SAT}(high)$$

where
- $V_{SAT}$=Power Amplifier Saturation Voltage
- $V_{HR}$=Voltage Head Room
- $V_S$=Power Supply
- $V_{GROUND}$=zero volts (in a preferred embodiment)

In essence the present invention adaptively minimizes voltage head room to improve seek operation performance. Specifically, if excessive head room voltage exists, then a more aggressive seek trajectory (velocity vs. position plot) can be employed to "use up" the available head room and complete the seek sooner. Namely, the DSP dynamically adjusts the seek control strategy (i.e., power to the VCM) based on readings at $V_{OUT}$ to execute a seek that is faster than what could be done without knowledge of $V_{OUT}$.

Figure 2:
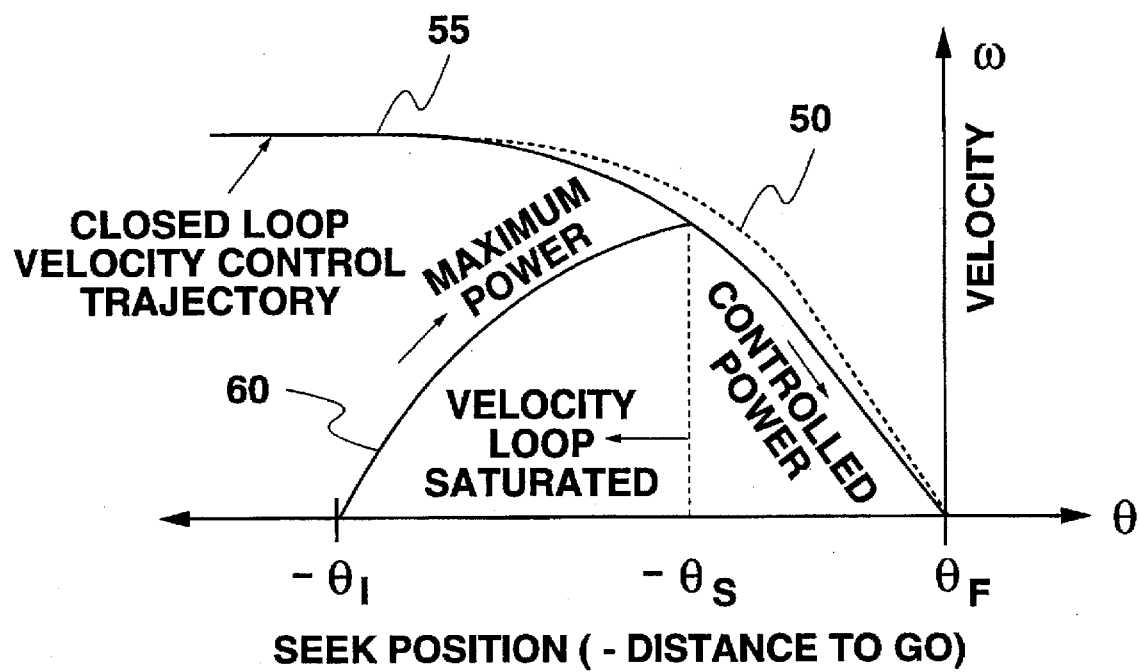
FIG. 2 is a phase plane plot of an improved seek trajectory of the present invention, relative to a conventional seek trajectory for a disk drive.

FIG. 2 is a phase plane plot of a seek trajectory adaptation 50 using the present invention, relative to a conventional seek trajectory 55 for a typical disk drive. A rotary actuator has been assumed so the position variable (distance to go) is θ (Theta) and the velocity variable is ω (Omega). However, the discussion that follows applies equally well to a linear actuator.

Closed loop velocity control trajectory 55 depicts the trajectory that would occur in a conventional seek from a given constant velocity to target position $θ_F$. For a conventional seek that starts at position $θ_1$ (velocity zero) and ends at $θ_F$ (velocity zero), maximum power is initially applied as shown at 60 to start the actuator moving. This is the acceleration phase where the velocity is steadily increasing. But once the velocity (ω) reaches closed loop control trajectory 55, power to the VCM actuator is "controlled" so that the velocity is reduced to precisely zero at the target position $θ_F$. This "controlled" section is the deceleration phase.

The trajectory shown at 55 illustrates a conventional curve representative of a "worst case" drive operating under "worst case" conditions, which is generally the default for industry standards. Trajectory 55 is, conventionally, the default seek trajectory at power-on for all disk drives. Trajectory 60 is the resultant trajectory when maximum power is applied.

In contrast, the present invention provides an improved seek trajectory for reduced seek time. Seek trajectory 50 shows how the conventional trajectory is modified to be more aggressive for a "typical" disk drive operating under "typical" conditions. Obviously, seek time is significantly reduced when trajectory 50 is utilized. Trajectory 50 is obtained by monitoring the voltage drive head room as previously discussed, and altering the seek strategy to take advantage of any voltage head room available. Although only a single adapted trajectory 50 is shown, it is obvious that other trajectories may be employed under principles of the present invention, depending on specific disk drive environment variables at issue, as obvious to those of ordinary skill in the art.

Figure 3:
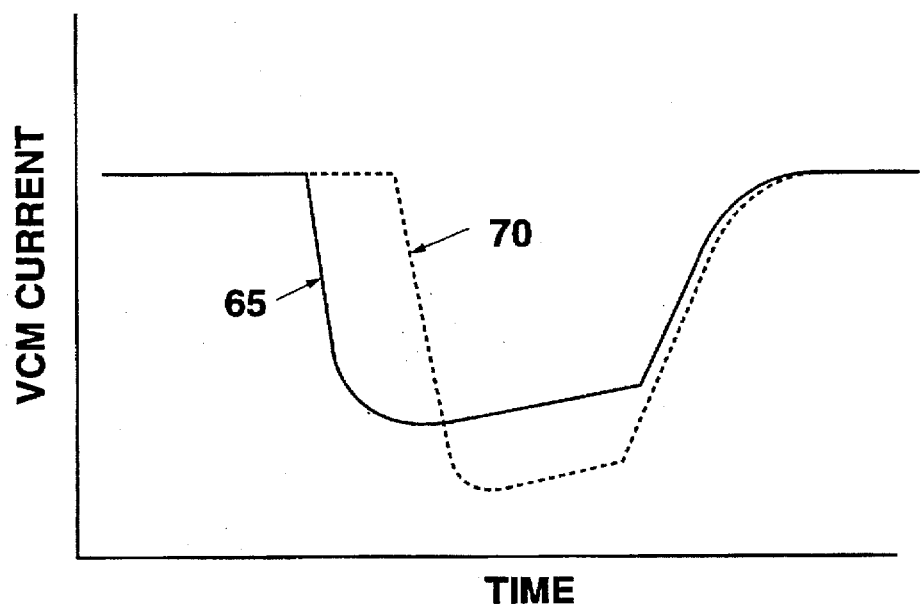
FIG. 3 is a plot of the coil current used during deceleration for the trajectories of FIG. 2.

FIG. 3 is a plot of the coil current used during deceleration for trajectories 50 and 55 of FIG. 2. Coil current profile 65 corresponds to conventional seek trajectory 55, and coil current 70 corresponds to the novel seek trajectory 50. As the seek trajectory is made more aggressive (trajectory 50) the coil current turn-on time will change and the amplitude will increase. In order to minimize seek time, the largest possible coil current is used (either positive or negative) for a lesser amount of time, as shown, subject to limitations imposed by the available power supply voltage.

Figure 4:
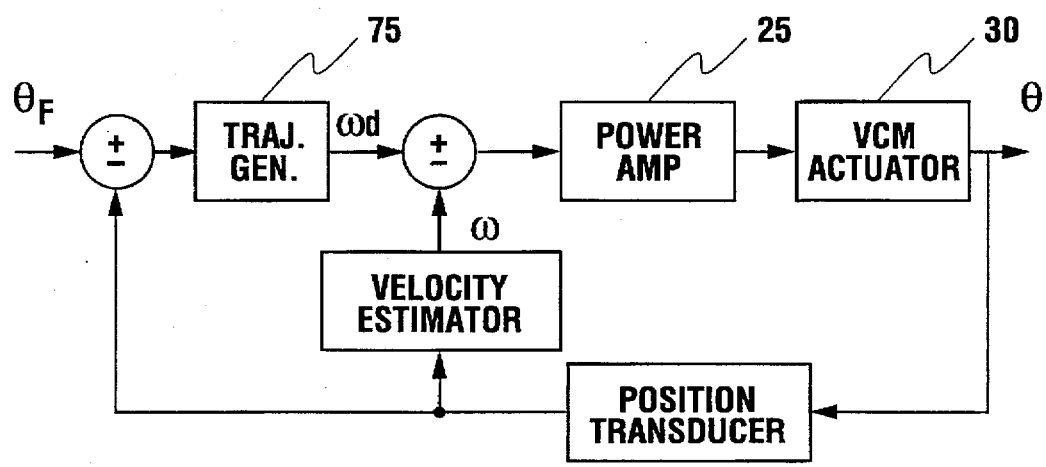
FIG. 4 is a block diagram showing the standard control loop configuration for accomplishing the conventional and modified seek trajectories of FIG. 2.

FIG. 4 is a block diagram showing the standard control loop configuration for accomplishing the conventional and modified seek trajectories of FIG. 2. Trajectory generator 75 uses the difference between the actual position (θ) and the desired position ($θ_F$) to determine an appropriate desired velocity ($ω_D$). The actual velocity value (ω) is subtracted from the desired velocity ($ω_D$) to generate an error signal that drives power amplifier 25. This creates a servo feedback loop which causes the actual velocity to follow the desired velocity down in value as the target position is approached.

To achieve minimum seek time, as depicted in trajectory 50 of FIG. 2, the actuator motor must be driven with the maximum available power supply voltage during both the acceleration and the deceleration intervals. However, prior designs have been unable to decelerate using the full power supply voltage. This is because the conventional deceleration trajectory has typically been designed such that a worst case motor could follow the deceleration trajectory even during worst case power supply voltage and while at maximum temperature. Consequently the deceleration trajectory that is conventionally used is quite conservative for a typical disk drive operating under typical conditions.

However, by adding the novel circuitry of the present invention to a conventional power amplifier, the voltage head room margin can be sensed and a deceleration trajectory can be automatically tailored (50) that is unique for a given disk drive. The specific trajectory chosen can take full advantage of the available power supply and the actual capabilities of a given actuator motor. Advantageously, the present invention does not require that all disk drives follow the same conservative trajectory. Rather, each drive can be allowed to move as fast as is possible for its particular actuator motor, the temperature, and the available power supply voltage.

Figure 5:
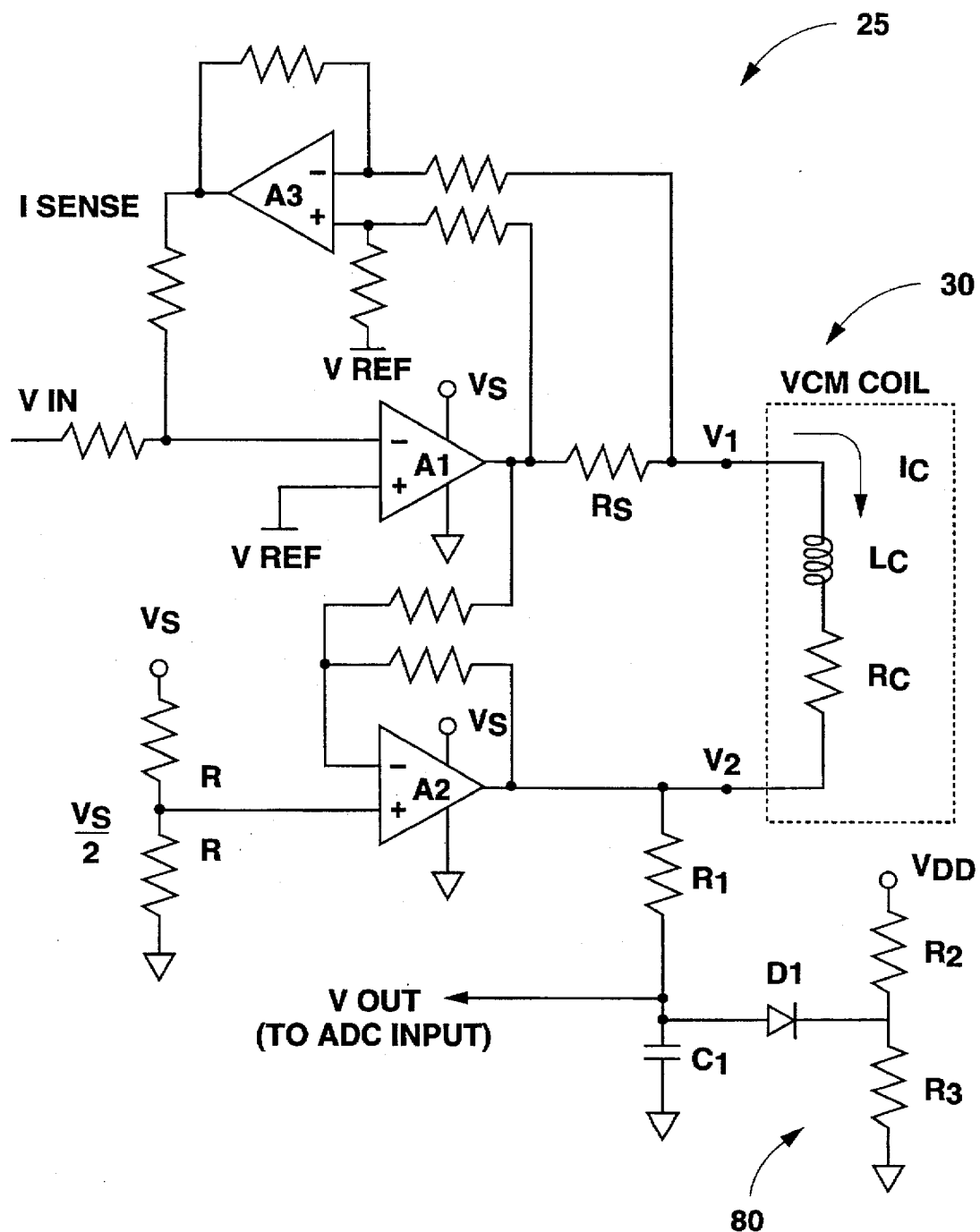
FIG. 5 is a simplified circuit diagram for a preferred embodiment of the power amplifier of FIG. 1.

FIG. 5 depicts a simplified circuit for a preferred embodiment of power amplifier 25 (of FIG. 1). The power amplifier is a transconductance amplifier, and produces a current ($I_C$) in the coil of VCM 30 that is proportional to the input voltage ($V_{IN}$). Amplifiers A1 and A2 directly drive each end of the VCM coil. The VCM coil is modeled as an inductance $L_C$ and a resistance $R_C$. Amplifier A2 is configured as a unity gain inverting "slave" to the output of amplifier A1. Furthermore, amplifier A2 is referenced to $V_S/2$ so that the VCM coil inputs V1 and V2 will swing symmetrically about $V_S/2$.

The current ($I_C$) flowing in the VCM coil creates a small voltage drop across sense resistor $R_S$. The voltage across $R_S$ is sensed by the differential-to-single-ended converter circuit created by amplifier A3. The output of amplifier A3 ($I_{SENSE}$) is summed into the input of amplifier A1 along with the input signal $V_{IN}$. This creates a feedback loop which causes the output current $I_C$ to follow the input voltage $V_{IN}$. The input voltage $V_{IN}$ and the current sense signal $I_{SENSE}$ are referenced to a signal $V_{REF}$ so that bipolar currents can be commanded and sensed in a circuit with a unipolar supply voltage $V_S$.

This particular configuration for the power amplifier is key to enabling a very simple circuit to be used to monitor the voltage head room. Because this particular configuration "splits" the power supply at $V_S/2$, the voltage head room at V1 will match the voltage head room at V2. This allows for reading of the head room at the low end of the voltage swing without concern for special circuitry to directly read the head room at the high end of the swing.

The voltage at V2 is filtered via resistor R1 and capacitor C1 and presented at $V_{OUT}$. R1 and C1 are selected to provide the desired filtering capacity. The output voltage ($V_{OUT}$) connects to an input channel on ADC 20 (FIG. 1). Diode D1 and resistors R2 and R3 create a voltage clamp circuit 80 that limits the voltage at $V_{OUT}$ to be less than the maximum safe value for the ADC (usually about 5 V). Specifically, R2 and R3 are selected to provide an upper voltage limit for $V_{OUT}$. DSP 10 reads the clamped voltage $V_{OUT}$ via ADC 20. This circuit, composed of R1, C1, D1, R2, and R3 is a novel aspect for implementing the present invention and is adaptable to conventional disk drive power amplifiers to monitor the head room voltage for adopting a more aggressive seek trajectory to minimize seek time.

The output amplifiers A1 and A2 in FIG. 5 can be characterized by a minimum and a maximum output voltage. As previously mentioned, the minimum output is $V_{MIN}$ and is equal to the ground voltage plus the saturation voltage, or: $V_{MIN}=V_{GROUND}+V_{SAT}(low)$.

The maximum output $V_{MAX}$ is the power supply voltage minus the saturation voltage, or: $V_{MAX}=V_S-V_{SAT}(high)$.

Figure 6:
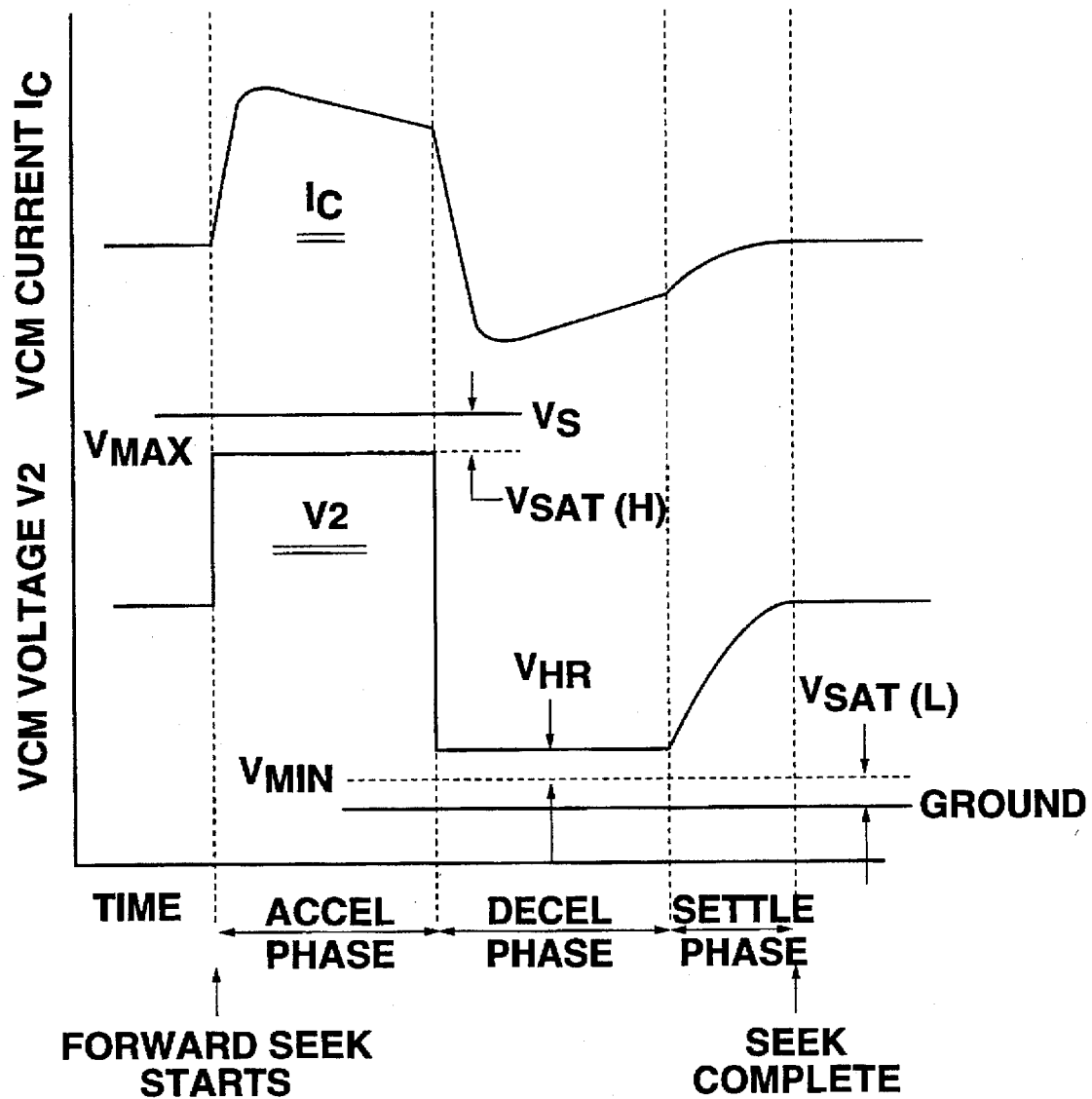
FIG. 6 is a graph showing current and voltage measurements for a forward seek using the circuit of FIG. 5.

FIG. 6 shows the current $I_C$ and the voltage at V2 for a seek in the "forward" direction ("forward" being defined as a seek from outside diameter (OD) to inside diameter (ID) of the disk, and "reverse" direction being defined as a seek from ID to OD). As shown, during the entire forward acceleration phase, the maximum voltage $V_{MAX}$ is applied at V2, but $V_{OUT}$ presents a clamped voltage due to clamp circuit 80 to avoid damage at the ADC. However, during the deceleration phase, the voltage at V2 is dropped down to very nearly $V_{MIN}$, but it still exceeds $V_{MIN}$ by a small amount, namely, the head room voltage $V_{HR}$. Furthermore, since the voltage at V2 during deceleration is within the clamping limits of clamp circuit 80, and therefore within conventional ADC read parameters, the same voltage at V2 is presented at $V_{OUT}$.

It is the voltage at $V_{OUT}$ during the deceleration phase of a forward seek that is specifically measured by the DSP via the ADC to determine the amount of control margin (head room) for improving seek time. If excessive head room voltage exists, then a more aggressive trajectory can be employed to "use up" the available head room and complete the seek sooner. This more aggressive trajectory is accomplished by the DSP causing more coil current $I_C$ to flow during the deceleration phase and thereby reduce the head room voltage $V_{HR}$ until a suitable head room voltage exists.

The available head room voltage is a direct function of the available power supply, the power amplifier characteristics, the VCM coil resistance, and the VCM current ($I_C$) used during deceleration to maintain the deceleration trajectory. This method of directly monitoring the voltage head room allows all those factors to be included to provide an adaptive seek servo system. Essentially the servo system is monitoring the one measurable parameter that provides all the necessary information to fully optimize the seek trajectory for a given situation. Thus, an "adaptive" seek servo system is provided.

This monitoring process is non-intrusive in that it does not affect normal disk drive operation. For example, as each forward seek is performed, the voltage at $V_{OUT}$ is read during deceleration and the seek trajectory adjusted accordingly. Even as the temperature of the VCM coil changes (and its resistance changes substantially with temperature) the adaptive seeks maintain a constant voltage drive by adjusting the amount of coil current used during deceleration. The deceleration trajectory is also modified to be consistent with the amount of coil current that can be used. As a result, the disk drive servo system adapts to perform the fastest possible seeks given the existing conditions at the time.

Figure 7:
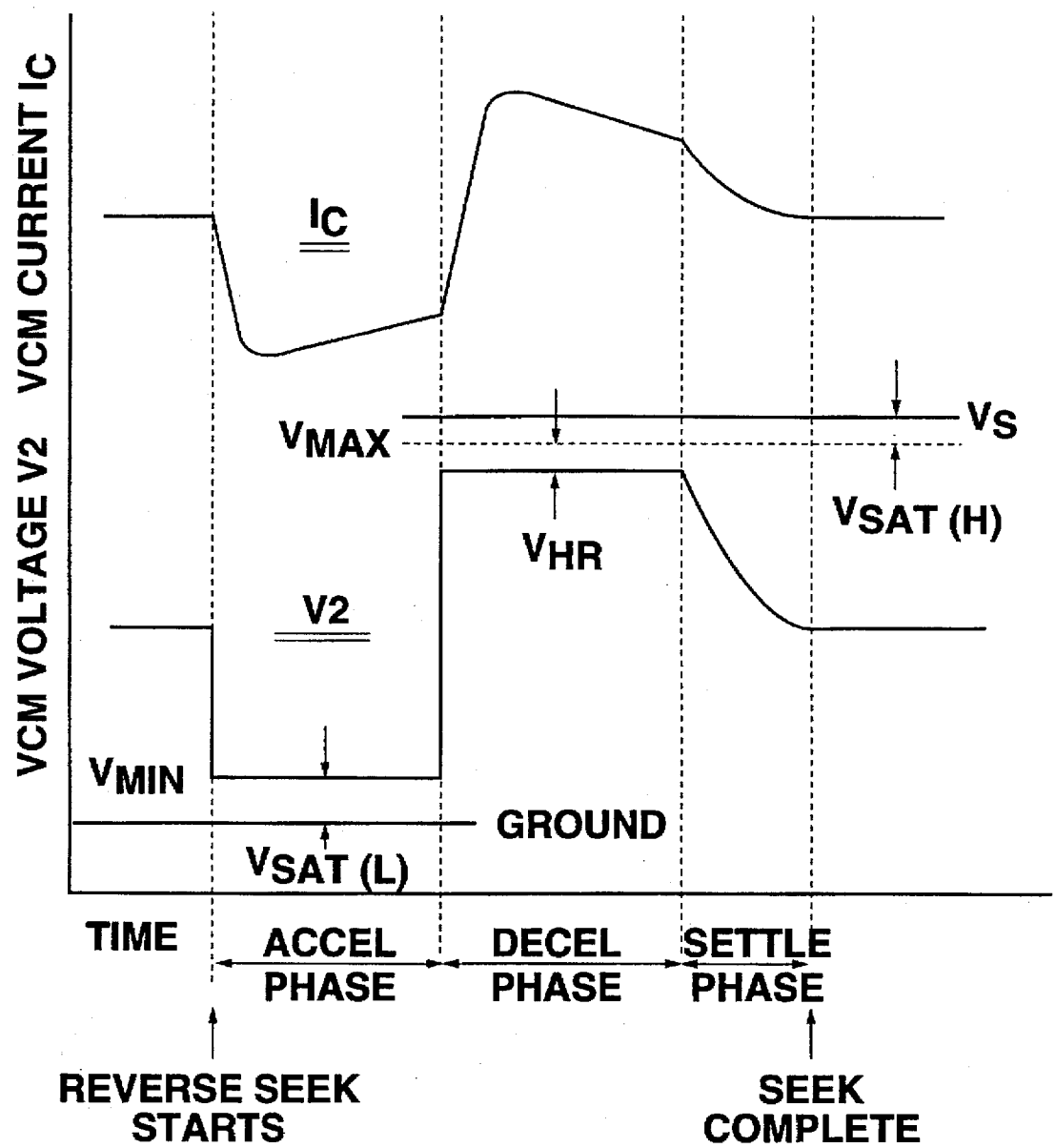
FIG. 7 is a graph showing current and voltage measurements for a reverse seek using the circuit of FIG. 5.

FIG. 7 shows the current $I_C$ and the voltage V2 for a seek in the "reverse" direction. During acceleration the voltage at V2 (and $V_{OUT}$ since no clamping occurs) is $V_{MIN}$ and is equal to $V_{SAT}(low)$ because ground is referenced as zero in this embodiment. This voltage is available to the DSP via the ADC so that the DSP can determine the value of $V_{SAT}(low)$ during reverse seeks. This reverse seek acceleration reading of $V_{SAT}(low)$ is used along with the forward seek deceleration reading of $V_{OUT}$ to uniquely determine $V_{HR}$. Namely:

$$V_{HR}=V_{OUT}(\text{forward deceleration})-V_{SAT}(\text{low; reverse acceleration})$$

Similar to a forward seek acceleration, the deceleration voltage during a reverse seek is up near $V_{MAX}$. In fact, it is $V_{MAX}-V_{HR}$, but this voltage is beyond the input range of a typical ADC so it can not be directly measured. (Typically $V_S=12$ V and the maximum ADC input is 5 V or less.) However, if the same type of seek trajectory is employed on reverse seeks as is used for forward seeks, then the structure of the power amplifier shown in FIG. 5 will guarantee that the head room voltage will be the same in each direction. Namely, since the preferred embodiment circuit provides symmetrical voltage readings at V1 and V2, then $V_{HR}$ will be equal for forward and reverse seeks. So even though the head room is only measured on forward seeks, the reverse seeks can also benefit from it.

Another subtle point to mention is that even on forward seeks, the deceleration head room voltage that is actually measured is in reality only half of the total head room voltage. This is because there is head room at both the high ($V_S$) and low ($V_{GROUND}$) ends, and since the power amplifier voltages at V1 and V2 swing symmetrically about $V_S/2$, the total head room is the sum of the head room voltages at V1 and V2. Although there is a head room voltage up near $V_S$ potential (which is out of the range of the ADC), the only voltage that is actually measured under the preferred embodiment at $V_{OUT}$ is when $V_{OUT}$ (and V2) is near 0 volts ($V_{GROUND}$). This is purposefully convenient because the ADC input range is usually between 0 V and 5 V. The present invention does not require that the head room voltage up near $V_S$ be directly measured because, as discussed, the structure of the power amplifier guarantees that these two head room measurements are equal (since V1 and V2 swing symmetrically about the voltage $V_S/2$). This eliminates the need for special circuits with amplifiers and level shifters that bring the high end head room voltage down into the range of the ADC.

To this regard, however, and referring back to FIG. 5 again, in an alternate embodiment of the present invention, clamp circuit 80 may be duplicated at V1 with an output connecting to another input on ADC 20 (FIG. 1). Although this alternate embodiment requires more circuitry and expense, it does provide a means for measuring the head room voltage and power amplifier saturation voltage on every seek in any direction.

Finally, in reference to any embodiment, by minimizing the voltage head room on the power amplifier, its power dissipation is reduced. As such, it is more efficient to apply the maximum possible voltage across the actuator coil to reduce seek time, rather than "waste it" by generating heat in the power amplifier.

In summary, what has been described above are the preferred embodiments for a method and apparatus for minimizing seek time in a disk drive. While the present invention has been described by reference to specific embodiments, it will be obvious that other alternative embodiments and methods of implementation or modification may be employed without departing from the true spirit and scope of the invention.

What is claimed is:

1. A method of minimizing seek time in a disk drive system having a power amplifier for controlling seek operations, the method comprising:

(a) determining a head room voltage for the power amplifier for at least a first seek operation, the head room voltage indicative of a margin of power available for controlling seek operations; and, (b) adjusting power to the power amplifier on a next seek operation based on the head room voltage determined, such that at least some of the margin of power available identified by the head room voltage is used on the next seek operation for reducing seek time.

2. The method of claim 1 wherein the step of determining a head room voltage includes detecting a voltage saturation value and a voltage output value from the power amplifier.

3. The method of claim 2 wherein the voltage saturation value and the voltage output value are detected during a single seek operation.

4. The method of claim 2 wherein the voltage saturation value is detected during an acceleration phase of a first seek operation in a first seek direction, and the voltage output value is detected during a deceleration phase of a second seek operation in an opposite seek direction.

5. The method of claim 2 wherein the head room voltage is the voltage output value less the voltage saturation value.

6. The method of claim 1 wherein the adjusting power to the power amplifier occurs during a deceleration phase of the next seek operation.

7. The method of claim 1 wherein the adjusting power to the power amplifier causes a correlative adjustment of power output of the power amplifier for controlling seek operations.

8. The method of claim 1 wherein the adjusting power to the power amplifier includes increasing a current flow level and reducing a current flow time at an output terminal of the power amplifier for controlling the next seek operation.

9. A method of minimizing seek time in a disk drive system having a power amplifier connected to a servo actuator for controlling seek operations, the method comprising:

(a) detecting a first voltage at an output terminal of the power amplifier during an acceleration phase of a first seek operation in a first direction;

(b) detecting a second voltage at the output terminal of the power amplifier during a deceleration phase of a second seek operation in an opposite direction;

(c) calculating a head room voltage for the power amplifier based on the first and second voltages detected, the head room voltage indicative of a margin of power available for controlling seek operations; and, (d) adjusting power to the power amplifier on a next seek operation based on the head room voltage calculated, such that at least some of the margin of power available identified by the head room voltage is used on a deceleration phase of the next seek operation for reducing seek time.

10. A system for reducing seek time in a disk drive, comprising:

(a) a power amplifier connected to a motor means for controlling a seek actuator;

(b) means connected to the power amplifier for determining a head room voltage for the power amplifier, the head room voltage indicative of a margin of power available for controlling seek operations; and, (c) means connected to the power amplifier for adjusting power to the power amplifier during a seek operation based on the head room voltage determined, such that at least some of the margin of power available identified by the head room voltage is used during a next seek operation for reducing seek time.

11. The system of claim 10 wherein the means for determining the head room voltage and the means for adjusting power to the power amplifier include processor means.

12. The system of claim 11 further including:

(a) a digital to analog converter (DAC) having an input terminal connected to the processor means and an output terminal connected to an input terminal of the power amplifier; and, (b) an analog to digital converter (ADC) having an output terminal connected to the processor means and at least one input terminal connected to at least one output terminal of the power amplifier.

13. The system of claim 12 wherein the power amplifier includes at least one clamp circuit connected to the at least one output terminal of the power amplifier for controlling voltage to the ADC.

14. The system of claim 10 wherein the power amplifier presents symmetrical voltage swings to the motor means for controlling seek operations.

15. The system of claim 10 wherein the means for determining head room voltage includes means for detecting a voltage saturation value and a voltage output value from the power amplifier during at least one seek operation.

16. The system of claim 15 wherein, selectively, (i) the voltage saturation value and the voltage output value are detected during any single seek operation, or (ii) the voltage saturation value is detected during an acceleration phase of a first seek operation in a first seek direction, and the voltage output value is detected during a deceleration phase of a second seek operation in an opposite seek direction.

17. The system of claim 15 wherein the head room voltage is the voltage output value less the voltage saturation value.

18. The system of claim 10 wherein the means for adjusting power to the power amplifier includes means for adjusting during a deceleration phase of the next seek operation.

19. The system of claim 10 wherein the power amplifier includes means for causing a current flow adjustment at an output of the power amplifier in correlation to a voltage change at an input of the power amplifier for controlling the motor means and seek actuator.

20. The system of claim 10 wherein the means for adjusting power to the power amplifier includes means for adjusting a voltage level at an input terminal of the power amplifier such that a current flow at an output terminal of the power amplifier increases during a reduced current flow time to cause a faster seek deceleration during the next seek operation.

* * * * *